United States Patent [19]
Hahn et al.

[11] 3,956,482
[45] *May 11, 1976

[54] MILK PRODUCTION

[75] Inventors: Peter A. Hahn, Grosse Point Park, Mich.; Kamal M. Abdo, Columbia, Md.

[73] Assignee: W. R. Grace & Co., New York, N.Y.

[ * ] Notice: The portion of the term of this patent subsequent to Dec. 31, 1991, has been disclaimed.

[22] Filed: Apr. 7, 1975

[21] Appl. No.: 565,837

Related U.S. Application Data

[63] Continuation-in-part of Ser. No. 373,142, June 25, 1973.

[52] U.S. Cl. .................................. 424/93; 426/2; 426/61; 426/71
[51] Int. Cl.$^2$ .................. A61K 39/02; A23K 1/00
[58] Field of Search .............. 424/93; 426/2, 61, 71

[56] References Cited
UNITED STATES PATENTS
3,857,971 12/1974 Abdo et al. ............................ 424/93

FOREIGN PATENTS OR APPLICATIONS
1,946,661 3/1971 Germany ............................... 424/93

OTHER PUBLICATIONS
Chemical Abstracts, Vol. 73, entry 96017s, 1970.
Clarke, New Zealand J. Agric. Res., Vol. 7, pp. 525–530, 1964.
Chandler P. T. et al. J. Dairy Sci. 58 (11): 1660-1665 "Lactational Response of Dairy Cows Inoculated with Live Adapted Rumen Micro-organisms.", Nov. 1975.
Allison M. J. et al. J. Anim. Sci. 23: 1164 (1964) Ruminal Changes After Overfeeding With Wheat and the Effect of Intra Ruminal Inoculation on Adaption to a Ration Containing Wheat.
Orth. A. et al. Milch Wirtsch Forsch 9:253–279 (1957) Some Observations on Digestive Process Occurring in the Rumen and Their Significance in Milk-fat Production.
Bondarekno, G. A. Dairy Sci. Abstr. 20 No. 2129 (1958) Effect of Feeding on Butterfat Synthesis in Cows.
Keeney, M. et al. J. Amoil, Chemists Soc. 39: 198–301 (1962) On the Probable Origin of Some Milk Fat Acids in Rumen Microbial Upids
Kuzdal–Savoie, S. Ann. Biolanimale, Biochim., Biophys 4(3): 287–295 (1964) Branched Fatty Acids in the Upids of the Food and Milk of Cows.
Makines, S. Ann. Acad. Sci. Finn Ser. A2 1972 (165) 67pp. Aspects of Nitrogen Metabolism and Nutritional Status of Urea Fed Dairy Cattle.

Primary Examiner—Shep K. Rose
Attorney, Agent, or Firm—Charles L. Harness

[57] ABSTRACT

The invention involves feeding certain rumen microorganisms to dairy cattle to increase milk production, butter fat, and non-fat milk solids. The microorganisms are especially cultured on and adapted to a high concentrate nutrient medium.

4 Claims, No Drawings

MILK PRODUCTION

This application is a continuation-in-part of U.S. Ser. No. 373,142, filed June 25, 1973.

The present invention is directed to inoculating dairy cattle with certain especially cultured rumen microorganisms at a specified period following calving. Production of milk, milk fat, and FCM (fat corrected milk) are substantially increased as a result of the inoculation. Excellent results are obtained when the rumen product is given the cow either at calving (i.e., within the 24 hours following calving) or in the period 80–140 days after calving.

The present invention starts with rumen microorganisms obtained from a cow or steer, freshly slaughtered or fistulated, or by stomach pump from an intact animal, using conventional procedures as generally known in the art. The sample, containing the rumen microorganisms is strained to remove particulate and other extraneous matter. In this regard, it has been found desirable during the collection to maintain the collection flask anaerobic and at a temperature in the range of from 36°–40°C. These rumen microorganisms then serve as the stock for the propagation of the adapted strains of rumen microorganisms.

For adaptation, the microorganisms are transferred to a flask containing a nutrient broth high in starch, e.g., a 45–95% concentrate feed (which may contain 40–75% starch). For example, the fresh rumen fluid may be transferred to a suspension of an 87% concentrate feed ration in water or preferably, in a mineral solution or nutrient broth similar in composition to that of the properly diluted ruminant saliva. The mixture containing the microorganisms and suspension of the high starch ration in incubated or cultured statically or continuously under anaerobic conditions (e.g., by bubbling carbon dioxide through the mixture), at a temperature in the range of 36°–40°C., and for a period of time sufficient to insure complete in vitro adaptation of the rumen microorganisms as may be indicated by the section on "Adaptation Indicia" below. In the case of static fermentation or culturing of the microflora, it has been discovered that a series or number of incubation stages is generally required for adaptation. In this regard, the initial sample, containing the rumen fluid and suspension of the specific feed ration, may be cultured for a period of 24 hours at a temperature in the range of from 36°–40° C. At the end of this period, a portion of the incubation mixture containing the rumen microorganisms is transferred to a fresh nutrient medium and the incubation is carried out for another 24 hour period under anaerobic conditions, etc. Such transfers may then be continued until complete in vitro adaptation of the rumen microflora is obtained. (See "Adaptation Indicia", below.) It has been generally observed that the rate of microbial proliferation and nutrient utilization is low in the first few transfers. However, as adaptation proceeds these rates increase and finally plateau at an optimum. Once the optimum is obtained, the rumen microorganisms are considered to be adapted. They can be used as such in this invention or can be used for propagation in mass quantities on the same nutrient broth used for processing the rumen inoculum preparation, and the mass-produced adapted rumen microorganisms ("ARM") can be used in this invention.

The use of static incubation conditions for the in vitro adaptation of the rumen microflora, as described above, however, should not be considered to be limiting. In this regard, for example, it has been found that the use of a continuous fermentation technique, although requiring somewhat more elaborate equipment, shortens the period required for the in vitro adaptation. In accordance with this technique, fresh nutrient media including a suspension of the feed ration is continuously introduced into a fermentation tank previously inoculated with rumen microorganisms, maintained anaerobic, and the effluent continuously withdrawn at a rate equal to that of the feed rate. The microorganisms of the effluent are discarded until such time as complete adaptation to the feed, as described above, is achieved.

The adapted rumen microorganisms, obtained in accordance with the static or continuous techniques, are preferably left in the broth for use. However, if desired, they can be separated from the fermentation broth by conventionally known procedures, as for example, filtration, centrifugation, etc. The filtrate is discarded. It is desirable that such manipulations, e.g., filtration, etc., be carried out under anaerobic conditions (e.g., under carbon dioxide) so as to obtain the maximum number of viable organisms.

CYCLE OF DAIRY COW IN LACTATION

At the time of calving, milk production of the cow is typically 40–50 lbs. of milk per day. This amount of milk increases, and may typically reach a peak of up to 70 lbs. soon after calving, and may remain at a level in this range for about a month, after which the cow is rebred. Productivity drops slowly for the next three months (ending 5 months from calving), then the decrease is rapid for the next 5 months (ending 10 months from calving), after which the cow is dry. After a 2-month dry period, the cow calves again, 12 months from the preceding calving, whereupon the cycle repeats.

A dairy cow can be inoculated with ARM, for improving milk production, at any phase of the lactation cycle. We prefer, however, to administer the ARM at one of two time periods: (a) at calving (i.e., within the first couple of days following calving), for early lactation; or (b) 80–140 days after calving.

The instant invention will generally provide increased lactation during these two periods, i.e.,: (a) at calving (and for the 2–4 months thereafter) and (b) during the 80–140 day period following calving, when lactation normally begins to decrease. With respect to (b) the instant invention in a typical case does not completely prevent an overall decrease, but is generally successful in reducing the expected amount of that decrease, as compared to a control cow which did not receive the ARM inoculation of this invention.

THEORY OF THE INVENTION

While we do not wish to be bound to any theory as to why our invention works, our experimental data indicate that our ARM is effective in increasing the acetate/propionate ratio in the rumen. As is well known, milk productivity is closely related to a high acetate/propionate ratio, and rises and falls in a qualitative relationship with this ratio. We have also established that at the point in the lactation cycle (beginning about 80–140 days) when milk production begins to decrease, a decrease in the acetate/propionate ratio of the cow's rumen may also be detected.

Accordingly, there is a considerable body of evidence that indicates that inoculation of the cow with our microbial product during this critical period will help to slow the further decrease, or to improve the acetate/propionate ratio. The reason for this is that our ARM contains principally acetate producing microbes. Acetate, as is well known, is preferentially metabolized in the mammary gland, resulting in higher milk production and butter fat. In support of these conclusions our data show that acetate in the rumen of a control cow runs typically 65.3 mole %, whereas in an inoculated cow it increases to 68.6 mole %. Respective acetate/propionate ratios are 3.2 for the control cow and 3.6 for the cow inoculated with our ARM.

The following examples are given as illustrative only and are not intended to limit the scope of the invention thereto.

Preparation of ARM (Examples 1–7)

EXAMPLE 1

The rumen contents of a roughage-fed disease-free tested steer were withdrawn by means of a stomach pump. The contents were filtered and 50 milliliters of the strained fresh rumen fluid were transferred to a flask containing 50 grams of a feed ration, having a composition as shown in Table 1, suspended in 1 liter of water.

Table 1

| Ingredient | (Ration I) Percentages |
|---|---|
| Ground corn | 56.5 |
| Ground corn cobs | 26.3 |
| Molasses | 3.5 |
| Soybean oil meal | 10.9 |
| Minerals | 2.4 |
| Vitamins A, $D_2$, E, antibiotic premix | 0.4 |

The suspension or mixture was cultured statically under carbon dioxide for a period of approximately 24 hours at 39°C. Anaerobic conditions in the flask were effected and maintained by bubbling $CO_2$ through the mixture. At the end of this period 50 milliliters of the incubation mixture containing the rumen microorganisms were transferred to a fresh nutrient suspension containing 50 gms. of the feed ration of Table 1 and this mixture was cultured under like conditions for another 24 hour period and at 39°C. The above procedure was repeated for a third and fourth 24 hour culturing period. At the end of the fourth transfer, complete in vitro adaptation of the rumen microorganisms was obtained as indicated by tests conducted pursuant to "Adaptation Indicia", below.

The resultant broth was then suitable for use as such in inoculating dairy cows. If it is to be administered as a drench, it may be given a coarse filtration to remove coarse matter that might otherwise plug a syringe. Or the microorganisms may be recovered as such, as a paste, by fine filtration, and placed in a bolus for administration via bolus gun. For other means of administration, see "Administration of ARM to the Cow", below.

For all of these examples for making ARM, once adaptation is achieved, a sample of such material can be used in "mass production" of larger quantities of broth, and the thus cultured microorganisms harvested will be in adapted form. In a typical instance of this technique, the starting microorganisms may be adapted in 100-ml flasks through the necessary stages, and in the final adapted stage the product may be used to inoculate the broth of a large scale (e.g., 40-gallon) fermentor.

EXAMPLES 2–5

The procedure of Example 1 was repeated in a series of three runs except with the substitution of the feed rations shown in Tables 2–5, for that shown in Table 1 of Example 1.

Table 2

| Ingredient | (Ration II) Percentage |
|---|---|
| Ration I (of Table 1) | 60 |
| Ground alfalfa hay | 10 |
| Ground corn silage | 30 |

Table 3

| Ingredient | (Ration III) Percentage |
|---|---|
| Milo (cracked) | 89 |
| Cottonseed meal | 5.0 |
| Alfalfa meal (dehydrated) | 5.0 |
| Salt and trace minerals | 1.0 |

Table 4

| Ingredient | (Ration IV) Percentage |
|---|---|
| Alfalfa hay (ground) | 12.5 |
| Timothy (ground) | 12.5 |
| Linseed meal | 5.0 |
| Cottonseed meal | 5.0 |
| Bone meal | 1.0 |
| Trace mineralized salt | 1.0 |
| Ground corn | 63.0 |

Table 5

| Ingredient | (Ration V) Percentage |
|---|---|
| Wheat | 89 |
| Cottonseed meal | 5.0 |
| Alfalfa meal (dehydrated) | 5.0 |
| Salt and trace minerals | 1.0 |

Each run gave ARM suitable for use in this invention.

THE NUTRIENT MEDIUM

The nutrient medium can comprise any feedstuff (basal ration) customarily fed to dairy cattle during lactation. These feeds ordinarily comprise about 45–95% concentrate (containing about 45–50% starch) suitably in the form of ground corn, grain (wheat), alfalfa, milo, cottonseed meal, linseed meal, soybean meal, and the like, plus forage or roughage (1–55%) such as hay, corn silage, ground corn cobs, beet pulp, and the like, plus (optionally) a small amount of molasses (0–10%), plus (optionally) a a small amount (0–10%) of nutritionally conventional minerals, e.g., salt, (0–10%), plus (optionally) very minor amounts of vitamins (0–1%). The mix may also include minor amounts of other conventional ruminant nutrients, e.g., bone meal, urea, and the like.

In addition to the basal ration feedstuff described in the preceding paragraph, an artificial saliva mix may optionally be added. The use of this mix is described elsewhere (see Example 6). The overall proportions of components to each other in the basal ration are unchanged when the artificial saliva mix is used, but of course in the overall nutrient medium they would be reduced in proportion to the amount of saliva mix added.

In summary, then, the nutrient medium (aside from added water) consists essentially of:

|  | Parts by Weight |
|---|---|
| Concentrate | 45 – 95 |
| Forage or roughage | 1 – 55 |
| Molasses | 0 – 10 |
| Minerals | 0 – 10 |
| Artificial saliva mix | 0 – 40 |

ARTIFICIAL SALIVA

A particularly desirable embodiment of the invention involves culturing rumen microorganisms anaerobically on a two-component substrate, namely (a) a high starch concentrate such as the ration described in any of the above tables and (b) an artificial saliva mix such as that shown in Table 6. The culturing is done under a carbon dioxide atmosphere. The microorganisms consume carbon dioxide as a nutritional requirement. Hence the preferred ingredients of this composition are the starch concentrate, the artificial saliva mix, and carbon dioxide gas.

In operating this embodiment sufficient water is added to give an easily stirrable mixture. Such amount of water is not critical and may be typically about 20 liters per kilogram of concentrate. The solids of the artifical saliva mix are preferably added in an amount to provide a ratio of 300 grams of such solids per kilogram of concentrate ration. A broadly operable range for these materials is 100–600 grams artificial saliva mix solids per kilogram of concentrate ration, and 10–40 liters of water per kilogram of concentrate ration.

This mixture can be used both in the inoculum flask and in the larger size fermentors. When used in the latter type of fermentors, the inoculum is suitably ARM, i.e., rumen microorganisms that have already been adapted to a starch concentrate. In such case the broth automatically and inherently comprises ARM.

The following example shows the use of such a mixture, using carbon dioxide.

EXAMPLE 6

500 Grams of a feed ration having the proportions stated in Table 6 were placed in a 14-liter fermentor (see description below) and the entire assembly was autoclaved for one-half hour at 15 lbs. of steam. 152.3 grams of an artificial saliva mix having the proportions stated in Table 6 were added to the fermentor and the volume was adjusted to 10 liters with deionized water. The fermentor was turned on and adjusted to 400 R.P.M. and $CO_2$ was bubbled through the mixture at 1 liter/min. When the temperature reached about 39°C. the fermentor was inoculated with 1 liter of 24-hour old adapted rumen microorganisms which had been cultured to adaption as in Example 1, and allowed to ferment for 8 hours. The resultant ARM broth was suitable for administration to dairy cattle by the process of this invention.

FERMENTOR EQUIPMENT

Fermentors of any conventional size and design can be used. In our work we used standard commercially available 14-liter and 30-liter fermentors. Essentially, each of these incorporated the same basic features. Both had means for automatic temperature maintenance by means of electrical immersion heaters. Both had electrically driven agitators and internal heat exchangers. Both had pH electrode ports. Also both had conventional liquids and solids addition means, as well as inlets and outlets for gas (for example, carbon dioxide). Both were made of Pyrex glass.

Additional information as to start-up and use of this equipment is given below. Reference is mainly to the 14-liter vessel, which used an 11-liter liquid volume. The 30-liter fermentor took 22 liters of liquid.

FERMENTOR MAKEUP STEP

The purpose of this step is to sterilize the medium as well as the fermentation vessel itself.

Sterilization of the fermentation medium used for the production of ARM differs somewhat from conventional fermentation media (such as that which is used for the production of antibiotics) insofar as all components of the ARM medium are preferably not sterilized together in the fermentor. The reasons for sterilizing several of the components separately is largely mechanical convenience. For instance, when one steam sterilizes a solution containing large quantities of sodium bicarbonate, a great deal of effervescence is encountered and hence the medium may "foam out" of the fermentation vessel.

The concentrate-containing meals too are preferably sterilized separately. When these meals are sterilized as a solution, an appreciable amount of hydrolysis of starch is encountered yielding saccharides and simple sugars. The presence of these simple sugars favors a lactic fermentation rather than one that produces the various volatile fatty acids (acetic, propionic, isobutyric, butyric, isovaleric and valeric acid) desirable in ARM fermentation.

The fermentor, all of the salts except sodium bicarbonate ($NaHCO_3$), and the water can suitably be sterilized as a unit. This includes the $Na_2HPO_4 \cdot 12\ H_2O$, NaCl, KCl, $MgSO_4 \cdot 7\ H_2O$ and $CaCl_2$.

The sodium bicarbonate is preferably sterilized separately using dry heat and is then added to the fermentor aseptically. This operation is suitably carried out in a covered Pyrex beaker at 120°C for 1 hour.

The meals for the nutrient medium including the ground corn cobs, dehydrated alfalfa meal, ground corn, dried beet pulp, cane molasses on soybean millfeed and protein supplement are suitably steam sterilized separately (as a mixture) and are then added to the fermentor aseptically. This sterilization operation is suitably carried out in a covered Pyrex beaker at 250°F. (15 psig) for 30 minutes.

Prior to each production run, the fermentor is charged with the water and salts (as per the above) and assembled. The stainless steel cage and head are assembled to the glass jar with airtight rubber gaskets and the $CO_2$ inlet and vent filters are connected to the appropriate ports with rubber tubing and secured with hose clamps. The gas inlet line is clamped off for autoclaving with a clamp. A sample line consisting of ⅜ inch rubber tubing is secured with a hose clamp to the sampling port and supplied with a clamp for regulation. The antifoam addition port is not needed and is closed off with a short length of rubber tubing and a clamp. The fermentor and its contents are then steam sterilized for 60 minutes at 15 psig of steam (250°F.) in an autoclave.

After sterilization the sodium bicarbonate and meals (as described above) are aseptically added to the fermentor through the addition port in the fermentor head. The fermentor assembly is finally connected to the service lines (water, electrical, and $CO_2$).

The main power switch is turned on; and the agitation is switched on and adjusted to the appropriate speed on the tachometer. The temperature control is then activated and set to "manual cooling" for one minute to prime the system. The switches are then set for "auto-cooling; heat-on", and the temperature is set for approximately 39°C. Finally, the $CO_2$ line is unclamped and gas flow is initiated at a suitable rate. (See below.)

INOCULATION STEP

The sterilized fermentor is aseptically inoculated with the equivalent of 10% fresh 24 hour old flask culture of the rumen microorganisms.

| Uninoculated Fermentor Volume | Inoculum Volume | Total Inoculated Volume |
| --- | --- | --- |
| 10 liter | 1 liter | 11 liter |
| 20 liter | 2 liter | 22 liter |

Preparation of the inoculum per se has been described above. See, for example, Example 1.

INCUBATION STEP

The preferred incubation conditions for producing ARM include the following:

| | 11 liter inoculated fermentor volume | 22 liter inoculated fermentor volume |
| --- | --- | --- |
| Incubation temperature | 39°C | 39°C |
| Agitation Rate | 400 RPM | 310 RPM |
| $CO_2$ Gas Flow Rate | 62.5 cc/min. | 125 cc/min. |
| Internal pressure | atmospheric | atmospheric |

The fermentation is terminated when the broth pH goes down to pH 6.0 ± 0.1 which occurs (on the average) after 7.1 hours of incubation. It is at pH 6.0 that we have obtained not only the maximum number of microbes possible but also have the maximum stability during subsequent storage.

CHILL STEP

The fermentor and its contents are then preferably chilled to about 60°F. via the internal heat exchanger within the fermentor. This step, which takes approximately 60 minutes, is important insofar as it "arrests" the growth and metabolic activities of these microbes.

SCREENING (COARSE FILTRATION) STEP

In the past we have found that some of the meals used in the fermentation medium have a tendency to plug several of the drench guns used for administering ARM in the field. For this reason the whole broth is preferably strained through a stainless steel screen (whose pore size is 1/16 inch) to remove these large, coarse particles. The final broth, whether or not screened, has a specific gravity of 1.01.

If the product is not to be administered via syringe, or is to be given in a manner where the coarse particles are not disadvantageous, then the coarse screening may be omitted.

ADAPTATION INDICIA

Since the crux of this invention is the use of rumen microorganisms that have been adapted to a ruminant feed containing a high percentage of concentrate, it is important to know when the microorganisms have been so adapted. Adaptation will occur inherently if the cultures are taken through a large number of culture stages or transfers on a high concentrate medium, say 15 or 20 stages. However, in most cases adaptation will occur long before this, and there are ways to determine such adaptation.

There are two tests for the rapid determination of adaptation: the volatile fatty acids (VFA) test and the test for laevo-lactic acid. The latter is carried out on inoculant preparations of rumen microorganisms and the former on fermentation broths. Both procedures should be followed meticulously as given below.

It is not required that the product meet both the lactic acid test and the VFA test, although, frequently, if it meets one it will also meet the other. It is sufficient that the product meet only one of the tests to be ARM.

A change of conditions can drastically alter results in tests for determining adaptation. By way of example, we can mention the following. Product shown to be ARM by the lactic acid method, as determined in 500 ml of material, and showing zero lactic acid, can actually show 0.3–0.7 mg/ml lactic acid following fermentation of an 11-liter batch using such ARM as inoculant. Nevertheless, the fermentation batch will show suitably high levels of VFA and will be ARM. Conversely, a culture done at the 500 ml level may show VFA of 0.6–2.0 mg/ml; but if it shows = 0.05 mg/ml lactic acid under the test conditions, it is ARM.

These two test procedures will now be described.

THE VFA TEST

The VFA system simply involves culturing the rumen microorganism through whatever stages are necessary to provide a fermentation liquor analyzing total volatile fatty acids (VFA) of at least about 3.5 mg/ml, such determination being made under the conditions hereinafter specified. The values can of course be higher. 3.7–4.0 mg/ml is typical. The average of 10 runs in the 11-liter fermentor (by the procedure herein given) was 5.29 mg/ml. We have seen values of 6–7 mg/ml and higher.

The aforesaid amount of VFA is obtained by measurements taken after the standard 8-hour fermentation described in Example 6 and in Table 9.

It will be evident that several factors are necessary to define adaptation, namely inoculum, nutrient medium, and fermentation conditions. Thus when we state an adaptation indicator of at least about 3.5 mg/ml VFA, this refers to VFA in the broth resulting from:

a. using an inoculum of 1 liter of rumen microorganism fluid, said fluid being either fresh from a bovine ruminant that is adapted to a high concentrate feed or preexisting as a culture of rumen microorganisms and having a trypticase soy agar count of $10^5$–$10^{10}$ microorganisms/ml.

b. using as nutrient broth, the mixture defined in Table 6 below:

Table 6

| Ingredient | 87% Concentrate Grams |
|---|---|
| Ground corn cobs | 38.75 |
| Dehydrated alfalfa meal | 26.50 |
| Ground corn | 342.00 |
| Dried beet pulp | 53.00 |
| Cane molasses on soybean meal feed | 13.25 |
| Protein supplement* | 26.50 |
| $Na_2HPO_4.12H_2O$ ⎫ | 69.80 |
| $NaHCO_3$ | 73.50 |
| NaCl ⎬ Artificial Saliva | 3.50 |
| KCl | 4.30 |
| $MgSO_4.7H_2O$ | 0.90 |
| $CaCl_2$ ⎭ | 0.30 |
| Deionized water | 9,347.70 |
|  | 10,000.00 |

*The protein supplement was prepared by mixing the following ingredients:

| Ingredient | Amount | |
|---|---|---|
| Soybean meal | 30 | lb. |
| Dehydrated alfalfa meal | 22.5 | lb. |
| Meat meal | 15.0 | lb. |
| Urea | 9.5 | lb. |
| Dicalcium phosphate | 5.0 | lb. |
| Ground limestone | 3.25 | lb. |
| NaCl and trace minerals | 12.5 | lb. |
| Vitamin A, D, and E premix | 2.9 | grams | c. fermentation conditions,
  i. 39°C. fermentation temperature.
  ii. broth stirred at 400 rpm.
  iii. $CO_2$ added to fermentor at 1 liter/min.
  iv. fermentation time, 8 hrs.

The entire medium (the 87% concentrate in Table 6 above) is ground in a Wiley mill to pass a 4 mm screen. This is a fairly coarse feed. Feed of this coarseness is selected in making adaptation tests for two reasons: (1) It is the same kind of feed that is customarily fed a ruminant, as to content and texture; and (2) only adapted rumen microorganisms show efficiency in converting concentrates of this coarseness to volatile fatty acids. Comment: even unadapted rumen microorganisms can utilize pure fine ground starch with at least modest efficiency. Such is not the case if the starch source (e.g., ground corn) is coarse ground as in commercial feedstuffs, e.g., as above described.

Using all the above conditions, if the resulting broth analyzes at least about 3.5 VFA, the rumen microorganisms in the broth are adapted (ARM). As a corollary, in the general case, it can also be concluded that the inoculant microorganisms that went into the fermentor were likewise adapted.

Volatile fatty acids, as the term is used above, include acetic, propionate, isobutyric, butyric, isovaleric, valeric, and perhaps trace amounts of a few others. With respect to nutritional requirements of the animal, acetic is the most important, followed by propionate and butyric acids. ARM converts starch largely into acetic acid, with smaller amounts of propionate and butyric acids.

Following customary usage in this art, "percent concentrate" refers to the amount of grains and other starch containing feed components. For example "87% concentrate" would mean that the feed (i.e., in this case the nutrient medium used in the fermentor) contains 87% "concentrate" and that the remaining 13% is roughage. Specifically, in the above table the 65.25 grams of roughage (ground corn cobs and dehydrated alfalfa meal) comprises 13% of the total of roughage and concentrate. The 87% concentrate is the aggregate of 434.75 grams of ground corn, dried beet pulp, cane molasses on soybean meal feed, and protein supplement. Thus the percentage does not refer directly to the exact amount of starch either in the concentrate portion or in the roughage portion.

The terms "concentrates" and "roughage" are used in the conventional sense. See, for example, the following definitions given in Morrison, F. B., Feeds and Feeding, 22d. Ed., PP. 15–16 (1959):

"Concentrates and roughages. These terms are convenient to separate feeds into two general classes upon the basis of their fiber content and the amount of total digestible nutrients they furnish.

"Concentrates are feeds that are low in fiber and high in total digestible nutrients. Examples of this class of feeds are the various grains and the high-grade by-products, such as hominy feed, wheat bran, cottonseed meal, linseed meal, corn gluten feed, meat scraps, etc. ***

"Roughages are feeds that are high in fiber and therefore low in total digestible nutrients.

Such feeds as hay, corn fodder, straw, and silage belong to this class. Some of the low-grade milling by-products, such as oat hulls, ground corn cobs, and cottonseed hulls are roughages rather than concentrates, for they are high in fiber and are low in feeding value."

To compare adaptation indicia for different types of rumen organisms, experiments were carried out wherein rumen from a hay-fed steer, rumen from a steer fed an 87% concentrate, and a previously cultured rumen fluid, were all fermented in the same nutrient medium under the same conditions.

In each case 1 liter of rumen fluid or rumen culture was used as the inoculant.

The rumen microorganism culture used as such had been prepared in accordance with the procedure of Example 1, and was known to be "adapted" as a result of prior experiments.

The steer that had been fed the concentrate, had been regularly fed a concentrate made up as follows:

Table 7

| Ingredient | 87% Concentrate Pounds |
|---|---|
| Ground corn cobs | 38.75 |
| Dehydrated alfalfa meal | 26.50 |
| Ground corn | 342.00 |
| Dried beet pulp | 53.00 |
| Cane molasses on soybean meal feed | 13.25 |
| Protein supplement* | 26.50 |

*The protein supplement was prepared by mixing the following ingredients:

| Ingredient | Amount | |
|---|---|---|
| Soybean meal | 30.0 | lb. |
| Dehydrated alfalfa meal | 22.5 | lb. |
| Meat meal | 15.0 | lb. |
| Urea | 9.5 | lb. |
| Dicalcium phosphate | 5.0 | lb. |
| Ground limestone | 3.25 | lb. |
| NaCl and trace minerals | 12.5 | lb. |
| Vitamin A, D, and E premix | 2.9 | grams |

With regard to the rumen fluid drawn from the steer fed the 87% concentrate, it was assumed that the microorganisms in that fluid were inherently adapted to the concentrate, and this assumption was verified in the course of the experiments. On the other hand we knew from previous experience that the rumen fluid from the hay fed steer would not show adaptation under the fermentation conditions, and would in fact give a relatively low VFA. This too was borne out by the work.

In carrying out these tests, as we have said, one liter of each of the three inoculating materials was used. This was added to the 14-liter fermentor, and the conditions stated immediately above (a, b, and c) were used in the experiments.

Referring first of all to Table 8 below, this table gives the properties of each of the three 1-liter portions of inocula that were added to the fermentor. For example the pH of the hay-fed rumen fluid was 7.0, its VFA was 2.7 mg/ml and so on. Comparable data are given for the properties of the one liter portions for concentrate-fed rumen fluid and for the ARM culture.

As we have said, each of these 1 liter inocula was used to inoculate an additional 10 liters of nutrient mix (see Table 6 above), and then the mix was fermented for 8 hours. At the end of this time samples were withdrawn from the fermentor, and each was examined. The results of these samples are given in Table 9.

10,000 g. batch there described can be made up, and 450 ml of that batch taken. Then 50 ml of rumen microorganism inoculant is placed in the flask. This rumen microorganism can be from any source. For example it can be the latest in a series of cultures, run as in Example 1, aiming at adaptation. Or it can be directly from a hay-fed or concentrate-fed steer. Or it can be a presumed ARM, being retested for continuing identity as ARM. Or it can be any other specimen of interest.

The flask is swept continuously with carbon dioxide through a sintered glass sparger which, being under the liquid surface, adequately agitates it. The flask is maintained at 39°C. for 24 hours. At the end of this time the procedure is discontinued, and the broth is tested for lactic acid.

When following adaptation of a rumen specimen from a hay-fed steer, the lactic acid of the starting specimen is generally very low, e.g., 0.0 to 0.02 mg/ml. Then, on first exposure to concentrate, it will jump to a very high level, e.g., 0.6–0.7 mg/ml. With succeeding

TABLE 8

| INOCULUM | pH | Acetic Acid | Propionic Acid | Isobutyric Acid | Butyric Acid | Isovaleric Acid | Valeric Acid | Total VFA | Trypticase Soy Agar Count |
|---|---|---|---|---|---|---|---|---|---|
| Hay-Fed Rumen Fluid | 7.0 | 1.9 | 0.5 | 0 | 0.3 | Trace | 0 | 2.7 | $6.5 \times 10^5$ |
| Conc.-Fed Rumen fluid | 7.0 | 1.7 | 1.3 | 0 | 0.3 | Trace | Trace | 3.4 | $4.2 \times 10^7$ |
| ARM Flask | 5.6 | 1.4 | 1.4 | 0 | 0.8 | Trace | 0.2 | 3.9 | $7.9 \times 10^7$ |

TABLE 9

| FERMENTOR (8 hr.) | | | | | | | | | |
|---|---|---|---|---|---|---|---|---|---|
| Hay Fed Rumen Fluid | 6.1 | 0.8 | 0.6 | 0 | 0.1 | 0 | 0 | 1.5 | $2.2 \times 10^9$ |
| Conc. Fed Rumen Fluid | 6.25 | 1.5 | 2.0 | 0 | 0.5 | Trace | Trace | 4.0 | $9 \times 10^5$ |
| ARM Flask | 6.4 | 1.7 | 1.5 | 0 | 0.6 | Trace | 0.2 | 4.0 | $2 \times 10^8$ |

THE LACTIC ACID TEST

In brief, this test involves culturing a specimen of rumen microorganisms under highly specific conditions and analyzing the resultant broth for laevo-lactic acid. If the lactic acid is 0.05 mg/ml or less, the rumen microorganisms in the broth are considered adapted; i.e., they are ARM.

The test procedure is as follows:

Into a 750 ml culture flask is placed 450 ml of nutrient medium of the mixture of Table 6. For example, the transfers or culture stages, lactic acid drops. In some cases the critical adaptation drop may be abrupt and dramatic. The course of lactic acid levels is shown in several typical runs in Table 10 below. In each of these runs, the initial specimen was 50 ml of rumen fluid from a hay-fed steer. It was cultured with 450 ml nutrient as above described, and then 50 ml of that broth used as the inoculant for the next culture stage, followed by succeeding cultures similarly inoculated by 50 ml from the preceding broth.

Table 10

Rumen Cultures, Lactic Acid in mg/ml of Broth

| Day | Run 104 | Run 1121 | Run 117 | Run 105 | Run 626 | Run 627 | Run 330 | Run 130P |
|---|---|---|---|---|---|---|---|---|
| 0 | 0.020 | 0.013 | 0.011 | 0.006 | 0.015 | 0.003 | 0.000 | 0.010 |
| 1 | 0.747 | 0.777 | 0.787 | 0.712 | 0.699 | 0.663 | 0.571 | 0.475 |
| 2 | 0.697 | 0.304 | 0.787 | 0.646 | 0.369 | 0.268 | 0.008 | 0.183 |
| 3 | 0.100 | 0.648 | 0.726 | 0.018 | 0.022 | 0.023 | 0.013 | 0.111 |
| 4 | 0.024 | 0.420 | 0.669 | 0.007 | 0.000 | 0.000 | 0.009 | 0.060 |
| 5 | 0.017 | 0.451 | 0.342 | 0.001 | 0.000 | 0.000 | 0.010 | 0.404 |
| 6 | 0.015 | 0.006 | 0.210 | 0.011 | 0.000 | 0.001 | 0.008 | 0.480 |
| 7 | 0.008 | 0.011 | 0.030 | 0.024 | 0.012 | 0.000 | 0.025 | 0.182 |
| 8 | 0.024 | 0.000 | 0.021 | 0.001 | 0.000 | 0.032 | 0.021 | 0.123 |
| 9 | 0.005 | 0.000 | 0.010 | 0.011 | 0.006 | 0.001 | 0.000 | 0.014 |
| 10 | 0.005 | 0.002 | 0.012 | 0.003 | 0.002 | 0.018 | 0.002 | 0.245 |
| 11 | 0.004 | 0.001 | 0.013 | 0.006 | 0.005 | 0.014 | 0.002 | 0.158 |
| 12 | 0.008 | 0.002 | 0.013 | 0.009 | 0.007 | 0.000 | 0.000 | 0.075 |
| 13 | 0.018 | 0.002 | 0.017 | 0.011 | 0.013 | 0.028 | 0.000 | 0.046 |
| 14 | 0.015 | 0.024 | 0.000 | 0.021 | 0.021 | 0.016 | 0.013 | 0.023 |
| 15 | 0.031 | 0.030 | 0.004 | 0.022 | 0.012 | 0.010 | 0.032 | 0.022 |
| 16 | 0.019 | 0.044 | 0.018 | 0.018 | 0.000 | 0.001 | 0.000 | 0.034 |
| 17 | 0.014 | 0.043 | 0.032 | 0.019 | 0.000 | 0.009 | 0.008 | 0.027 |

Table 10-continued

Rumen Cultures, Lactic Acid in mg/ml of Broth

| Day | Run 104 | Run 1121 | Run 117 | Run 105 | Run 626 | Run 627 | Run 330 | Run 130P |
|---|---|---|---|---|---|---|---|---|
| 18 | 0.023 | 0.035 | 0.048 | 0.017 | 0.000 | 0.000 | 0.012 | 0.023 |
| 19 | 0.012 | 0.033 | 0.039 | 0.005 | 0.000 | 0.004 | 0.003 | 0.040 |
| 20 | 0.004 | 0.013 | 0.026 | 0.003 | 0.012 | 0.001 | 0.004 | 0.026 |
| 21 | 0.007 | 0.008 | 0.011 | 0.015 | 0.009 | 0.016 | 0.000 | 0.011 |

The runs in the above Table will bear discussion. Referring to Run 104, this shows a rather idealized system of transfers. The rumen sample at the start contains 0.020 mg/ml lactic acid. In the first culture (Day 1) at the end of 24 hours the broth contains 0.747 mg/ml lactic acid. This high level is brought about by the change from hay to concentrate in the nutrient medium for the rumen microorganisms. This high level of lactic acid continues into the second transfer, Day 2. Day 3 shows a drastic drop in lactic acid level to 0.100 mg/ml, which shows that the rumen microflora are becoming adapted. However, the lactic acid level is not yet acceptably low. On Day 4, the lactic acid level has now dropped to 0.024 mg/ml. The transfers were continued for a total of 21 days (and in fact somewhat longer) and at no time during the ensuing sequence of transfers did the lactic acid level reach an unacceptably high concentration. The transfer for Day 4 which gave 0.024 mg/ml lactic acid indicated an adapted rumen microorganism.

Run 117 is somewhat like Run 104 except that adaptation was more gradual and took about twice as long. Runs 105, 626, 627, and 330 showed very rapid adaptations. In fact, Run 330 showed adaptation on the second transfer, Day 2, for a lactic acid concentration of 0.008 mg/ml. Run 130 P was the slowest of the series to reach adaptation. This sequence shows on Day 4 a lactic acid level of 0.060. However, this trend was immediately reversed on the following two days. Lactic acid began to fall again on the seventh day and reached a pseudo-acceptable level on Day 9 (0.014 mg/ml). However, the trend was reversed again on the 10th day when the level reached 0.245 mg/ml, and from this level it fell gradually to an acceptable level of 0.046 mg/ml on the 13th day. From thence forward it stayed at an acceptable level. In view of the "reversal" on and after Day 9, we prefer to make three transfers in sequence, all giving ≤ 0.05 lactic acid, before we consider that the microorganisms are ARM.

L-lactic acid is determined in the known way. Our analytical procedure is based on the Boehringer-Mannheim Lactate Test Kit, available commercially. In principle, l-lactic acid is converted to pyruvic acid in the presence of diphosphopyridine nucleotide and lactic dehydrogenase. The hydrogenated diphosphopyridine nucleotide produced in this reaction is measured spectrophotometrically at 366 m$\mu$. See Hohorst, H. J. in H. U. Bergmeyer: Methods of Enzymatic Analysis, Verlag Chemie Weinheim, 1st edition, 1962, p. 622; and Laudahn, G., Klin. Wschr. 37, 850 (1959).

Decreasing l-lactic levels indicates that the rumen microbe population is successfully converting lactic acid to volatile fatty acids (the chief energy sources available to the ruminant), and this in turn means that the rumen microbe population is becoming adapted to the concentrate feed and/or culture.

ADMINISTRATION OF ARM TO THE COW

Once the ARM is made in the broth it can be given to the cow in a number of different ways.

The best and simplest way known to us is simply to give the animal a drench of whole broth. The drench can be given by means of a conventional syringe. As already discussed, if the broth has gross material in it that might plug the orifice of the syringe, then it is preferred that the broth be given a coarse filtration prior to use. This removes coarse matter while retaining the ARM. Prior to use the broth, whether or not filtered, can be stored. It will last indefinitely without change if stored at a temperature of 0° to 4°C. Actually it can be stored at room temperature for about 1 week without harm. The reason for the latter possibility is that, when harvested at a pH of 6, there is still sufficient nutritional matter in the broth, so that if the microorganisms begin to grow again, for example by reason of failure of refrigeration, or by deliberate exposure to room temperature, the microorganisms will have available sufficient food for several days.

The amount of broth to be given an animal depends to a considerable extent on the body weight of the animal. For example with the usual breeds of dairy cattle, we have found that the volume of drench (of whole broth) per 1500 pounds of animal body weight should be about 3 to 20 fluid ounces. Since a dairy cow weighs about 1500 lbs. on the average, this works out to be approximately a 3-ounce to 20-ounce drench per cow. Ordinarily this is given but once, either at calving, or 80–140 days after calving.

A 12-ounce drench is useful and typical. However, we have used 3 and 6-ounce drenches with good results. A drench volume in excess of 20 ounces is operable but is generally unnecessary. A 12-ounce drench may contain $10^6$–$10^{12}$ microorganisms as determined by the trypticase soy agar (TSA) count method. As is known, this method counts only viable organisms and of these, only organisms that will grow on this particular agar medium. The actual count is therefore presumed higher. Using the TSA count, ARM in Table 9 shows a low of $9 \times 10^5$ per ml and a high of $2 \times 10^8$. For 12 ounces, these figures are multiplied by the number of milliliters in 12 ounces, or about 352, to give about $3 \times 10^8$ and about $7 \times 10^{10}$ respectively. Since this is our typical dosage for a typical dairy cow weighing 1500 lbs., these numbers may, if desired, be prorated to obtain dosages for dairy cattle weighing more or less than 1500 lbs. Actually, as a practical matter, one can use a 12-ounce drench for all dairy cattle regardless of weight.

Dairy cattle may weigh 1,200–2,000 lbs., depending on breed, age, and other factors. Fifteen hundred pounds is typical.

It is also advantageous to mix the microbial cell paste (obtained by centrifugation or filtration of the broth with a carrier, as for example, a mixture of sugar (e.g., lactose) and cellulose), and to then transfer the resulting mixture to a gelatin or other type conventional capsule known in the art. The capsules can then be stored at normal refrigeration temperatures if they are to be used within a short period of time. For long term storages it is preferable to store the capsules in a sharp frozen state. The capsules can be administered to the cow via bolus gun.

Also, the adapted rumen microorganisms may be simply admixed with the feed ration to be fed to the cattle. In this latter administration mode the microorganisms can be microencapsulated using techniques to minimize processing exposure to oxygen and coating materials which are minimally permeable to oxygen and other materials in the dry feed which are noxious to the microorganisms, but which coating materials readily dissolve in the rumen fluids when ingested by the ruminant thereby releasing the live and unaltered microorganisms. Methods of microencapsulation are disclosed, e.g., in U.S. Pat. Nos. 2,800,457 and 2,800,458. Such microencapsulated in vitro adapted rumen microorganisms are preferably admixed with the specific feedstuffs to be fed the ruminants.

When the ARM product is added to, or mixed with, the cow's feed, this can be done by pouring broth on the feed, or by adding encapsulated ARM to the feed, or by mixing centrifuged (or filtered) ARM paste with the feed. Other modes of addition are also suitable. The amount, however added, should be sufficient to provide about $10^6$–$10^{12}$ microorganisms. Since most dairy cattle eat 30–50 lbs. of total feed/day (concentrate and forage), this means the addition of about $2 \times 10^4$ to $3.3 \times 10^{10}$ microorganisms/lb. of feed. Broth made by the preceding examples (and starting from a pre-cultured ARM inoculant) normally contains $10^8$–$10^9$ microorganisms/ml, or about $3 \times 10^9$ –$3 \times 10^{10}$/ounce, or about $3.6 \times 10^{10}$–$3.6 \times 10^{11}$ per 12 ounces, but the count may vary somewhat from batch to batch. Bacteria counts are readily made by those skilled in the art, so this feature is easily determined. Accordingly, then, in a typical and simple case, 12 oz. of broth (screened or unscreened) can be added directly to the feed. As we have mentioned, this can provide about $10^6$–$10^{12}$ microorganisms.

Another method of preparing ARM for administration to the cow is to freeze the material as soon as it is ready for use. This is done by any of several means including placing the container of microorganisms into an acetone-dry ice bath, placing said container in liquid nitrogen, or placing said container into a freezer. Generally it is desirable to lower the temperature of the additive to about −20°C. The amount of time required to attain this temperature varies with the method used and takes only a matter of seconds when liquid nitrogen is used, to an hour when a freezer is utilized. At a later time the additive can be thawed and spread over the feed.

Another method of preparing the additive for administration is to freeze-dry the whole broth, (i.e., the cultured aqueous suspension). This is accomplished by centrifuging the whole broth until approximately 9/10 of it can be decanted; decanting and adding 10% based upon the weight of the remaining whole broth of glucose to the remaining whole broth; freezing this mixture in a refrigerator; placing the frozen mixture into a drier; subjecting it to reduced pressure; and allowing the frozen mixture to gradually warm to room temperature. When needed, the additive can be mixed with an inert carrier and applied across the feed.

When the additive is frozen or freeze-dried it is preferable to mix the whole broth with a cryo-protective agent such as glycerol, sucrose, glucose, casein, and whey. A suitable ratio is 100 parts of whole broth to 6 parts of cryo-protective agent. The purpose of the cryo-protective agent is, of course, to protect the microorganisms from damage during the freezing process.

In the general case, only one ARM treatment is given per cow for a given season. In exceptional cases, when it is apparent that the initial dose was inoperative, one or more additional doses can be given.

Inoculation of Dairy Cattle with ARM

EXAMPLE 8

Late Lactation

Twelve Holstein cows paired by production, age, and body size were assigned to control or to ARM inoculation. Inoculation was at 100 to 120 days in lactation with a drench of twelve fluid ounces of whole broth ARM, 355 ml, and about $5 \times 10^8$ bacteria per/ml. Milk yield composition and feed intakes were measured for 2 weeks prior and 8 weeks subsequent to inoculation. Cows were fed concentrate at a ratio of 1:3, and forage (i.e., hay and corn silage) was offered free choice. (Comment: the "1:3" ratio means that the cow is being fed concentrate at the rate of 1 lb. concentrate for each 3 lbs. of milk that the cow produces.)

Data on these experiments are reported in the following two tables. In summary these tables show the following:

Control and inoculated cows respectively produced (average per cow) 22.3 kilograms milk (18.2 kilograms FCM) (FCM = Fat corrected milk) and 22.8 kilograms milk (20.8 kilograms FCM) per day. Inoculated cows produced 9% more milk (20.8 vs. 22.7 kilograms) and 17% more FCM (16.7 vs. 19.8 kilograms) during weeks 7 and 8. Milk fat was consistently higher in inoculated cows. A small elevation in molar % of acetate (typically to 13%) was detected in the rumens of inoculated cows. Feed intakes were almost identical for the two groups (17.9 and 17.7 kilograms/cow/day).

Table 11

Milk Production and Composition for Control and Adapted Rumen Microorganism Treated Cows at 110 Days in Lactation
(Note: "FCM" means fat corrected milk.)

| Parameter | Treatment | |
|---|---|---|
| | Control | Inoculated |
| Pre-experimental period; 2 wks. | | |
| Milk, kg (average per cow) | 25.10 | 23.48 |
| 4% FCM, kg (average per cow) | 20.87 | 19.92 |
| Fat, % | 2.98 | 3.02 |
| Solids-not-fat, % | 8.28 | 8.35 |
| Total Solids, % | 11.26 | 11.37 |
| 8-Week Average | | |
| Milk, kg (average per cow) | 22.29 | 22.81 |
| 4% FCM, kg (average per cow) | 18.18 | 20.04 |
| Fat, % | 2.78 | 3.22 |
| Solids-not-fat, % | 8.31 | 8.56 |
| Total Solids, % | 11.09 | 11.78 |
| Average Weeks 7 & 8 | | |
| Milk, kg (average per cow) | 20.77 | 22.67 |
| 4% FCM, kg (average per cow) | 16.67 | 19.78 |
| Fat, % | 2.72 | 3.18 |
| Solids-not-fat, % | 8.33 | 8.46 |
| Total Solids, % | 11.05 | 11.64 |

Table 2

Feed Intake on Dry Matter Basis (kg/cow/day)
For Control and Adapted Rumen Microorganism
Treated Cows.

| Parameter | Treatment Control | Inoculation |
|---|---|---|
| Pre-Experimental | kilograms | |
| Concentrate | 8.75 | 8.49 |
| Hay | 0.76 | 0.82 |
| Corn Silage | 9.22 | 9.15 |
| Total | 18.73 | 18.46 |
| 8-Week Average | | |
| Concentrate | 8.76 | 8.44 |
| Hay | 0.76 | 0.81 |
| Corn Silage | 8.42 | 8.48 |
| Total | 17.94 | 17.73 |
| Average Weeks 7 & 8 | | |
| Concentrate | 8.70 | 8.38 |
| Hay | 0.77 | 0.78 |
| Corn Silage | 7.65 | 8.09 |
| Total | 17.12 | 17.25 |

EXAMPLE 9

Early Lactation

Sixteen cows were paired. One group of eight was dosed at calving with a single 12-oz. drench of ARM broth (prepared as above) per cow, and the other group of eight served as uninoculated control.

Results 12 weeks after treatment are as follows:

| | Control | ARM Treated |
|---|---|---|
| Average daily milk production | 31.5 kilo/day | 34.9 kilo/day (+10.8%) |
| Fat corrected basis (4%) | 23.9 kilo/day | 27.4 kilo/day (+14.6%) |
| Solids not fat production (lactose & protein) | 2.6 kilo/day | 3.0 kilo/day (+15.4%) |

The value of the invention in this Example is illustrated below:

12 weeks × 7 days = 84 days
84 days × 3.4 kilos/day increased production = 285.6 kilos milk
285.6 kilos × 2.2 = 628.32 pounds of milk
$7.00/cwt milk × 6.28 = $43.96 extra product for 12 weeks, per cow, as a result of ARM treatment.

While particularly advantageous composition and method embodiments of the present invention have been described and illustrated by examples, it will be recognized by those skilled in the art that various changes and modifications can be made therein without departing from the scope of the invention defined by the appended claims. For example, as should be readily apparent to those skilled in the art, a great number of rations for ruminant animals comprised of various feedstuffs can be formulated so as to meet the basic nutrient requirement of the animal. Thus, the compositions of the rations used in the examples should not be considered limiting.

The microorganism population of ARM has been identified as follows:

| Identification | Relative Percentage |
|---|---|
| Megasphaera elsdenii | 0 – 4 |
| Streptococcus bovis | 30 – 42 |
| Lactobacillus acidophilus | 3 – 10 |
| Bifidobacterium adolescentis | 12 – 20 |
| Bacteriodes ruminicola | 18 – 44 |
| Butyrivibrio fibrisolvens | 3 – 12 |

In the above table, relative percentage refers to numbers of individual microorganisms of a given species as a proportion of the total number of microorganisms.

Obviously, not all the microorganisms can be present at the upper limits nor all at the lower limits, of their respective ranges, since this would add to less than 100 or to over 100%, respectively; however, each stated microorganism has been identified within its respective range.

Reference is made to U.S. Pat. No. 3,857,971, Abdo and Cahilly, which issued on Dec. 31, 1974, on U.S. Ser. No. 373,263, filed June 25, 1973, owned by the same assignee as the instant application. Said U.S. Ser. No. 373,263 was copending with U.S. Ser. No. 373,142, filed June 25, 1973, the parent case hereof. U.S. Pat. No. 3,857,971 discloses and claims inter alia methods for culturing rumen microorganisms to achieve adaptation on high concentrate nutrient media, said methods being identical to those disclosed herein and in said U.S. Ser. No. 373,142. Said methods provide the ARM to be fed to cows pursuant to the instant invention. Reference is also made to U.S. Ser. No. 519,450, filed Oct. 31, 1974, a continuation-in-part of Ser. No. 373,263, Abdo and Cahilly, also owned by the same assignee, claiming ARM (made in the same way) as a composition of matter and methods of feeding same to ruminants to aid digestion and to treat sickness.

What is claimed is:

1. The method of improving rumen acetate/propionate ratios and milk production which is well known to be closely related to a high acetate/propionate ratio, and rises and falls in a qualitative relation with this ratio, in a lactating dairy cow that comprises administering to the rumen of the lactating cow at calving or 80–140 days after calving an effective amount of acetate-producing rumen microorganisms, effective to increase the acetate/propionate ratio in the rumen cultured on and adapted to a high concentrate nutrient medium, said acetate-producing microorganisms consisting essentially of:

| Identification | Relative Percentage |
|---|---|
| Megasphaera elsdenii | 0 – 4 |
| Streptococcus bovis | 30 – 42 |
| Lactobacillus acidophilus | 3 – 10 |
| Bifidobacterium adolescentis | 12 – 20 |
| Bacteroides ruminicola | 18 – 44 |
| Butyrivibrio Fibrisolvens | 3 – 12 | the nutrient medium being an aqueous broth the solids of which consist essentially of:
   45–95 parts concentrate
   1–55 parts forage or roughage
   0–10 parts molasses
   0–10 parts minerals
   0–40 parts artificial saliva mix.

2. The method according to claim 1 in which the effective amount is $10^6$ to $10^{12}$ microorganisms.

3. The method according to claim 2 in which the microorganisms are administered as 3 to 20 liquid ounces of said cultured broth as a drench to the animal.

4. The method according to claim 3 in which the amount of drench is 12 ounces.

* * * * *